Sept. 26, 1950     C. O. MARSHALL, JR     2,523,437
DUPLEX EXPRESS SCALES
Filed Aug. 10, 1946     3 Sheets-Sheet 1
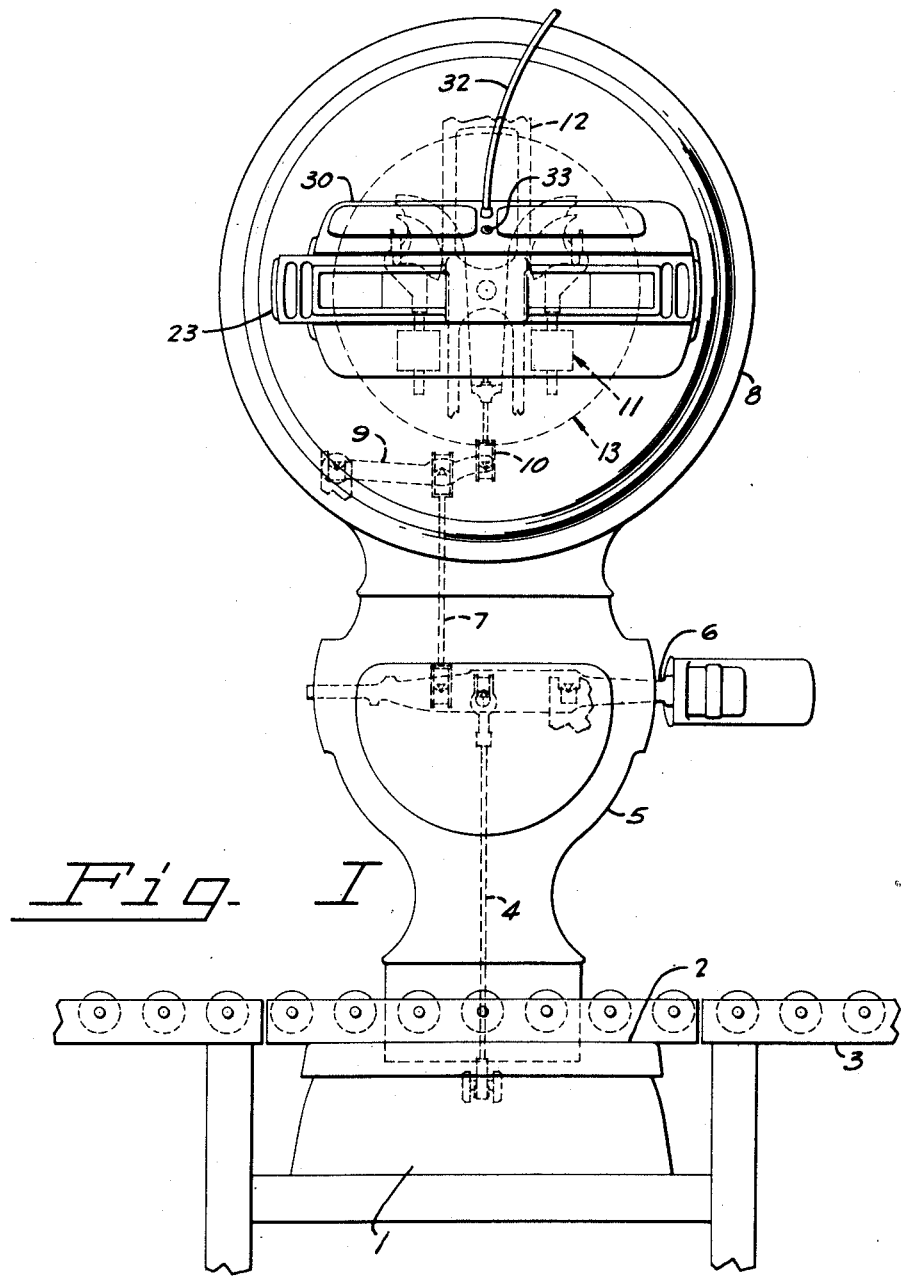
Fig. I
INVENTOR.
Charles O. Marshall, Jr.
BY
Marshall and Marshall
ATTORNEYS Sept. 26, 1950     C. O. MARSHALL, JR     2,523,437
DUPLEX EXPRESS SCALES
Filed Aug. 10, 1946     3 Sheets-Sheet 2
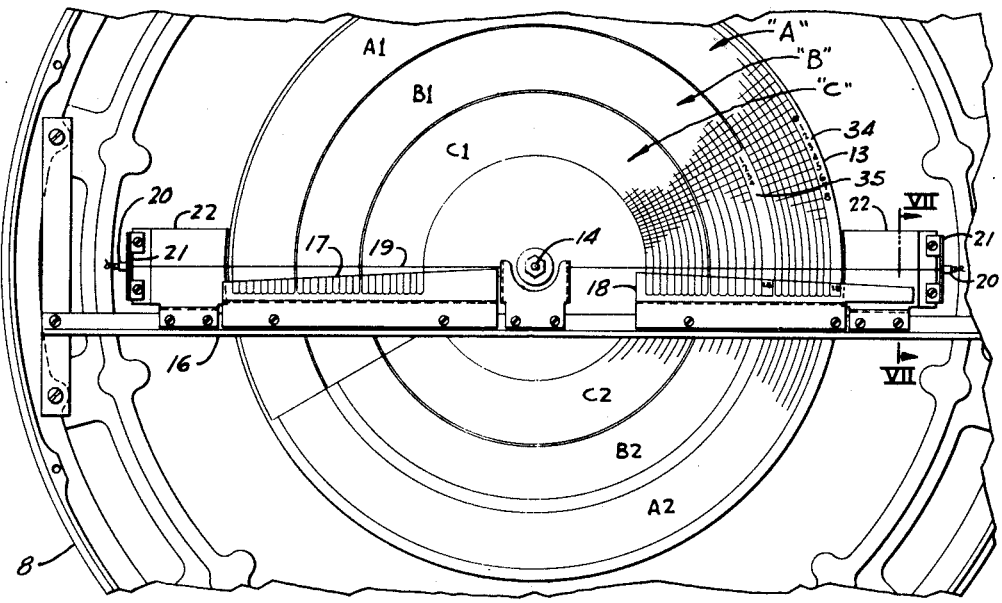
Fig. II
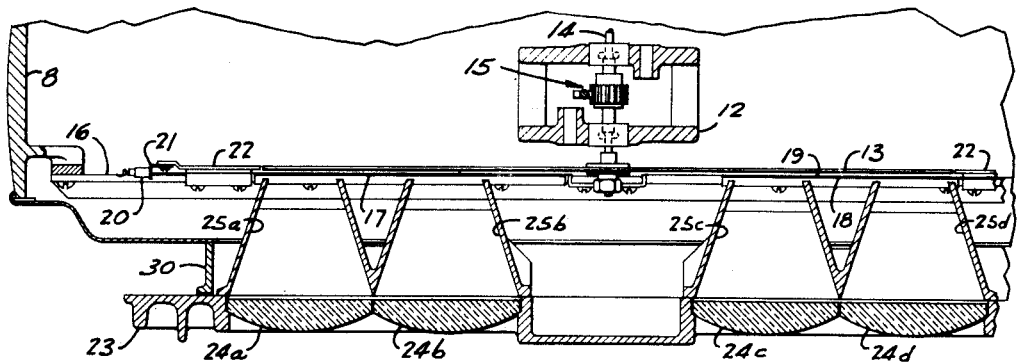
Fig. III
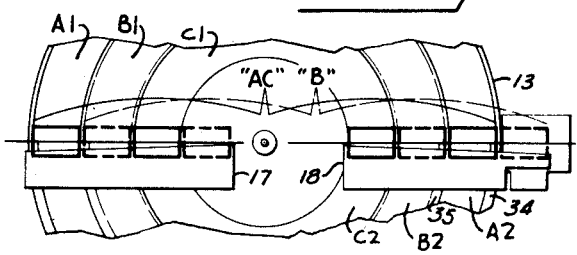
Fig. IV
INVENTOR.
Charles O. Marshall, Jr.
BY
Marshall and Marshall
ATTORNEYS Sept. 26, 1950 C. O. MARSHALL, JR 2,523,437
DUPLEX EXPRESS SCALES
Filed Aug. 10, 1946 3 Sheets-Sheet 3
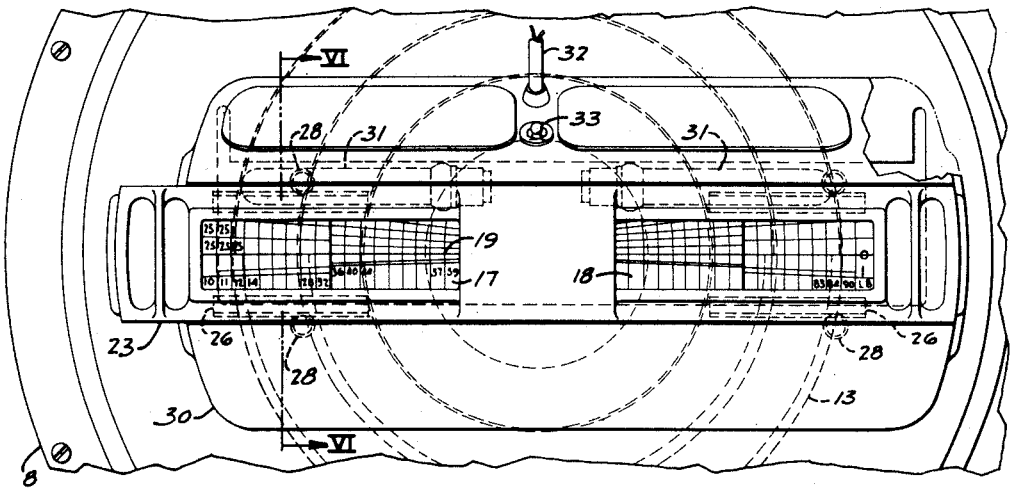
Fig. V
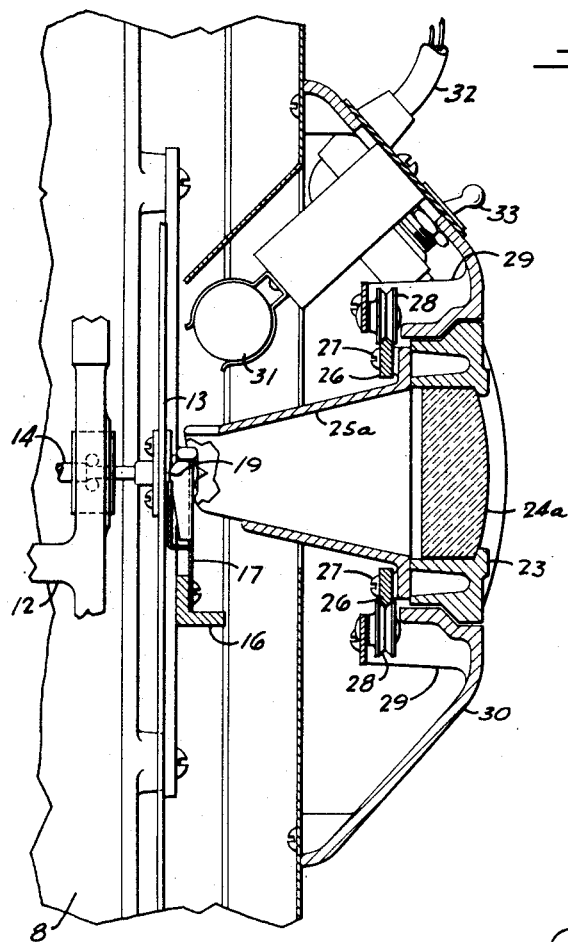
Fig. VI
Fig. VII
INVENTOR.
Charles O. Marshall, Jr.
BY
ATTORNEYS Patented Sept. 26, 1950

2,523,437

UNITED STATES PATENT OFFICE 2,523,437

DUPLEX EXPRESS SCALES

Charles O. Marshall, Jr., Toledo, Ohio, assignor to Toledo Scale Company, Toledo, Ohio, a corporation of New Jersey Application August 10, 1946, Serial No. 689,802

2 Claims. (Cl. 235—83)

This invention relates generally to weighing scales, and more particularly to indicating mechanism for automatic computing dial scales.

Most computing scales, for example those used in retail stores are of the "cylinder" type because of the great area available on the surface of the cylinder chart for the imprinting of computed values. Many industrial uses, however, require computing scales of comparatively high capacities (i. e. ranges in the neighborhood of zero to one hundred pounds). Cylinder scales are not available in such capacities, so dial weighing scales ordinarily are used. However, dial weighing scales have limited chart areas and therefore adequate indicia arrangements for all purposes cannot be accommodated to them.

The principal object of this invention is the provision of means for increasing the number of computed values which may be imprinted on the chart of a dial scale.

Another object is the provision of means for extending the range of prices and computed values of dial scale indicating devices without increasing the physical dimensions of the dials.

Still other objects are to improve the legibility of price and value indicia of dial scale indicating devices, and to minimize the liability of error in reading the indicia.

Still another object is the provision of means to facilitate the finding of prices and corresponding computed values.

Other objects and advantages will be apparent from the following description, in which reference is had to the accompanying drawings illustrating a preferred embodiment of the invention, wherein similar reference numerals designate similar parts throughout the several views.

A preferred embodiment of the invention may be an express scale having a range of zero to one hundred pounds. According to the Railway Express Company System, all cities are designated by "block" numbers, such numbers ranging from 103 to 2545. In any particular city, an express agent may determine the zone in which another city lies, with respect to his own city by referring to a rate table which gives the zone for every other city, with respect to the agent's city. The zones range from 1 to 319 and a uniform price per pound is set on articles to be shipped to the same zone.

From these data one might suppose that 31,900 (100 times 319) indicia would be required for an express scale dial chart. However, it has been determined that 80 per cent of the shipments from any particular city will go to approximately 24 zones, and that as much as 92 per cent of the shipments will go to approximately 48 zones. Therefore, it is possible to make a dial chart which bears only 4800 (100 times 48) indicia and which still will be of practical value to the express agent 90 per cent of the time.

In the drawings:

Figure I is a front elevation of an express scale embodying the invention.

Figure II is an enlarged fragmentary front elevation of the dial housing with its front cover removed.

Figure III is a fragmentary horizontal sectional view taken substantially along a center line of the dial housing with its front cover and a set of magnifying lenses in place.

Figure IV is a fragmentary diagrammatic front elevation on a reduced scale of the chart showing two positions of the magnifying lenses.

Figure V is a fragmentary front elevation of the dial housing showing the operator's view of representative price and value indicia for one position of the magnifying lenses.

Figure VI is an enlarged fragmentary vertical sectional view of the dial housing taken substantially along the line VI—VI of Figure V.

Figure VII is an enlarged detail vertical sectional view of a reading line bracket taken along the line VII—VII of Figure II.

Referring to the drawings in detail, in Figure I a base 1 encloses a set of levers (not shown) which support a load platform 2. The platform 2 carries a section of a conveyor system 3 to facilitate moving articles on and off the load platform 2. A pullrod 4 rising vertically through a column 5 pivotally connects the levers (not shown) supporting the load platform 2 with a tare beam lever 6. A steelyard rod 7, rising vertically from the column 5 into a dial housing 8, pivotally connects the tare beam lever 6 with a pendulum lever 9. A yoke 10 connects the pendulum lever 9 with an automatic load counterbalancing mechanism 11 which is supported by a frame 12 (see Figure III).

A disc-like chart 13 (see Figure II) is mounted on a pinion shaft 14 and is rotated through an angle proportional to the weight by the means of a pinion and rack 15 (see Figure III) which are actuated by the automatic load counterbalancing mechanism 11. On the chart 13 there are placed concentric sets of value indicia "A," "B", and "C." Each of the sets of indicia "A," "B" and "C" is divided into two semicircular groups of indicia, "A1" and "A2," "B1" and "B2," and "C1" and "C2," each of such groups consisting of several semicircular series of indicia.

An angle iron cross frame 16 fastened at its extremities to the dial housing 8 extends across the front of the chart 13 slightly below the center of the chart. Two plates, 17 and 18, bearing price indicia (in the embodiment shown, each price is related to a certain zone) are fastened to the cross frame 16, one on each side of the center of the dial chart 13. The plates bear a price indicium for each of the series of indicia on the chart (one plate 17 for semicircular groups "A1," "B1" and "C1," and the other plate 18 for semicircular groups "A2," "B2" and "C2"). A reading line 19 is stretched horizontally across the front of the chart directly over a diameter. The reading line 19 is held in tension by small compression springs located in thimbles 20, fastened to wings 21 (see Figure VII) which are bolted to brackets 22. The brackets 22 are mounted near the extremities of the cross frame 16.

The indicia on the chart 13 are so arranged that an operator can read a particular value for any given weight to be shipped to any desired one of a plurality of zones which are designated on the plates 17 and 18, at a point directly above the desired zone indicia along the reading line at either side of the chart.

Referring to Figure III, mounted in a sliding bezel 23 are four spherical lenses 24a, 24b, 24c and 24d of such magnifying power and at such a distance from the face of the chart 13 that the indicia on the chart, viewed through the lenses, are magnified two times both horizontally and vertically. Secured to the rear side of the sliding bezel 23 is a set of frusto-pyramidal lens cells 25a, 25b, 25c and 25d, each lens cell being positioned directly back of one of the lenses 24a, b, c or d (see also Figure VI) and having an opening in its forward end corresponding substantially to the area of the lens, and an opening at its rear end adjacent the front side of the chart 13 substantially one-fourth the area of the lens. Hence, the portion of the chart 13 viewed through each of the lenses and lens cells, is one-half as high and one-half as wide as the face of the lens; but because both its height and width are magnified two dimensions, the portion of the chart viewed through the lens appears to be substantially coextensive in area with the lens. The interior of each lens cell as seen through its lens appears as a rectangular passage, the walls of which appear not to converge, but to extend parallel to each other rearwardly from each edge of the lens; thus the adjacent sides of each two lens cells appear to merge into one thin wall extending directly to the rear (see Figure V).

Referring to Figure VI, the sliding bezel 23 is mounted on upper and lower tracks 26 which tracks are fastened by screws 27 to the rear of the upper and lower edges of the bezel 23. The tracks 26 slide on grooved rollers 28 which are rotatably mounted above the upper track and below the lower track on bosses 29. The bezel 23 is thus allowed horizontal but not vertical motion. The bosses 29 extend rearwardly from the interior of a scroll 30 which is bolted to the front cover of the dial housing 8. To illuminate the chart, lamps 31 are mounted on the inside upper portion of the scroll 30 and connected with an electric cord 32 and switch 33.

The bezel is movable to two reading positions "AC" and "B" (see Figure IV). In the first position, "AC," the four lens cells are directly over spaced groups of indicia "A1," "C1," "C2" and "A2," but to the observer it appears that these particular groups "A1," "C1," "C2" and "A2" occupy the entire length of the diameter of the chart 13 exposed through the rectangular openings in the bezel 23. When the bezel 23 is shifted to the second position "B," two of the lens cells are over the other inter-disposed groups "B1" and "B2" which appear to the operator in a similar manner, the groups "A1," "C1," "C2" and "A2" being eclipsed from view.

Two series of weight indicia 34 and 35 are provided on the chart, one being visible in each of the two positions of the sliding bezel 23.

The embodiment of the invention which has been disclosed may be modified to meet various requirements.

Having described the invention, I claim:

1. In a weighing scale, in combination, a chart that is rotated a half revolution in response to a capacity load on the scale, the chart having a plurality of sets of indicia arranged along concentric circles and each extending approximately one half of a circumference of one of the concentric circles, a reading line extending across the chart horizontally along a diameter thereof, a dial housing for enclosing and supporting the rotatable chart and reading line, a frame mounted on the dial housing for enclosing and supporting the rotatable chart and reading line, a frame mounted on the dial housing and extending along the reading line, a sliding bezel mounted in the frame for movement along said reading line, and a plurality of lenses mounted in the bezel, some of the lenses being located on one side of the center of the chart and some on the other side, said bezel being movable so that all parts of the reading line may be brought into the field of view of the lenses.

2. In a weighing scale, in combination, a chart that is rotated a half revolution in response to a capacity load on the scale, the chart having a plurality of sets of indicia arranged along concentric circles and each extending a half revolution of one of said circles, a reading line extending horizontally along a diameter of the chart, means for carrying the reading line past the hub of the chart, a dial housing for enclosing and supporting the rotatable chart and reading line, a frame mounted on the dial housing, a sliding bezel mounted in the frame for movement along the reading line, and a plurality of lenses mounted in the bezel with their fields of view apparently contiguous, and extending along the horizontal diameter of the chart, said bezel being movable to a first position at which certain of the sets of indicia are visible and a second position at which the others are visible.

CHARLES O. MARSHALL, Jr.

REFERENCES CITED

The following references are of record in the file of this patent:

UNITED STATES PATENTS

| Number | Name | Date |
| --- | --- | --- |
| 956,682 | Cochran | May 3, 1910 |
| 1,973,685 | Marshall | Sept. 11, 1934 |
| 2,178,155 | Williams | Oct. 31, 1939 |